US008868795B2

(12) United States Patent
Ke

(10) Patent No.: US 8,868,795 B2
(45) Date of Patent: Oct. 21, 2014

(54) DATA PROCESSING DEVICE FOR MULTIPLE HARDWARE SYSTEMS, SWITCHING METHOD AND COMPUTER PROGRAM PRODUCT

(75) Inventor: Haibin Ke, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 283 days.

(21) Appl. No.: 13/262,210

(22) PCT Filed: Mar. 30, 2010

(86) PCT No.: PCT/CN2010/071414
§ 371 (c)(1),
(2), (4) Date: Sep. 29, 2011

(87) PCT Pub. No.: WO2010/111942
PCT Pub. Date: Oct. 7, 2010

(65) Prior Publication Data
US 2012/0047286 A1 Feb. 23, 2012

(30) Foreign Application Priority Data
Mar. 31, 2009 (CN) .......................... 2009 1 0080976

(51) Int. Cl.
*G06F 3/00* (2006.01)
*G06F 3/023* (2006.01)
(52) U.S. Cl.
CPC ....................................... *G06F 3/023* (2013.01)
USPC ................................... 710/7; 710/14; 710/18
(58) Field of Classification Search
USPC ............................................................ 710/7
See application file for complete search history.

(56) References Cited

U.S. PATENT DOCUMENTS 6,910,148 B1 * 6/2005 Ho et al. ........................ 714/4.4
2005/0060458 A1 3/2005 Yu
(Continued)

FOREIGN PATENT DOCUMENTS

| CN | 1591367 A | 3/2005 |
|---|---|---|
| CN | 1797377 A | 7/2006 |
| CN | 1825285 A | 8/2006 |

OTHER PUBLICATIONS

International Preliminary Report on Patentablity issued by the International Bureau of WIPO.
English Translation of the Abstract in CN1797377A.

*Primary Examiner* — Henry Tsai
*Assistant Examiner* — Dean Phan
(74) *Attorney, Agent, or Firm* — Dentons US LLP

(57) ABSTRACT

A data processing device with multiple hardware systems and a switching method thereof are provided. The device comprises a first hardware system, a second hardware system, a shared device and a switcher, wherein the first hardware system is connected to the shared device through the switcher, and includes a first inquiry module for inquiring information on applications currently executed in the first hardware system so as to obtain an inquiry result, a first control module for triggering the first inquiry module to perform inquiry when it is required to switch from the first hardware system to the second hardware system, and a first communication module for transmitting the inquiry result to the second hardware system; and the second hardware system includes a second communication module for receiving the inquiry result, a second control module for, in accordance with the inquiry result, activating corresponding applications in the second hardware system so as to generate a first message, and transmitting the first message to the first hardware system through the second communication module; wherein the first control module instructs the switcher to switch the shared device into connection with the second hardware system when the first message is received by the first hardware system through the first communication module.

10 Claims, 2 Drawing Sheets

(56) References Cited

U.S. PATENT DOCUMENTS

| | | |
|---|---|---|
| 2008/0052708 A1 | 2/2008 | Zhong |
| 2009/0222592 A1* | 9/2009 | Anderson et al. .................. 710/8 |
| 2010/0082784 A1* | 4/2010 | Rosenblatt et al. ........... 709/222 |

* cited by examiner

DATA PROCESSING DEVICE FOR MULTIPLE HARDWARE SYSTEMS, SWITCHING METHOD AND COMPUTER PROGRAM PRODUCT

CROSS-REFERENCE TO RELATED APPLICATION

This is a National Phase of International Application No. PCT/CN2010/071414 filed on Mar. 30, 2010, which claims priority from Chinese Patent Application No. 200910080976.3, filed on Mar. 31, 2009.

TECHNICAL FIELD

This invention relates generally to electronics, and particularly to a data processing device with multiple hardware systems, a switching method and a computer product program.

BACKGROUND

Current technology of a data processing device for mixed hardware systems is increasingly becoming more mature. The data processing device for mixed hardware system is formed by additionally embedding and integrating at least one hardware system, which also can be referred to as a sub-system, on the premise of the original hardware system. A plurality of hardware systems operate in cooperation with each other. These systems share corresponding devices such as a keyboard, a mouse, a monitor, and a switch that generally can be used to switch the shared device for use by a hardware system.

The following problems appear to exist in related arts. When a hardware system is switched to another hardware system, applications currently executed by a user in the hardware system that requires switching has to be re-opened in the switched hardware system.

If an application is used by the user to perform operations such as editing, playback or the like, on a file in a hardware system to be switched, after this application is re-opened by the user in the switched hardware system, the user needs to revert back to the original operational position. Switching between hardware systems could cause cumbersome operational inconvenience to the user.

SUMMARY

The present invention overcomes a technical problem by providing a data processing device with multiple hardware systems and a switching method that can achieve a seamless switching between hardware systems.

The data processing device with multiple hardware systems comprises a first hardware system, a second hardware system, a shared device and a switcher, wherein the first hardware system is connected to the shared device through the switcher, and includes a first inquiry module for inquiring information on applications currently executed in the first hardware system so as to obtain an inquiry result; a first control module for triggering the first inquiry module to perform inquiry when it is required to switch from the first hardware system to the second hardware system; and a first communication module for transmitting the inquiry result to the second hardware system; the second hardware system includes: a second communication module for receiving the inquiry result; a second control module configured for, in accordance with the inquiry result, activating corresponding applications in the second hardware system so as to generate a first message, and transmitting the first message to the first hardware system through the second communication module; wherein the first control module instructs the switcher to switch the shared device into connection with the second hardware system when the first message is received by the first hardware system through the first communication module.

The inquiry result comprises a first inquiry result and a second inquiry result; the first inquiry module includes an application inquiry unit for inquiring applications currently executed in the first hardware system so as to obtain the first inquiry result; an operational information inquiry unit for inquiring files respectively operated by applications currently executed in the first hardware system as well as operation positions in the files, so as to obtain the second inquiry result; the second control module includes an application activation unit for activating corresponding applications in accordance with the first inquiry result; an operational state adjustment unit for, in accordance with the second inquiry result, opening corresponding files in corresponding applications so as to jump to corresponding operation positions, generating the first message, and transmitting the first message to the first hardware system through the second communication module.

The application activation unit is further used for, after activation of corresponding applications, generating a second message, and transmitting the second message to the first hardware system through the second communication module; the application inquiry unit starts to perform inquiry when triggered by the first control module; and the operational information inquiry unit starts to perform inquiry after the second message is received by the first hardware system through the first communication module.

The operational information inquiry unit employs an absolute path or a relative path in the second inquiry result to indicate files operated by applications; or transmits files operated by the applications to the second hardware system through the first communication module, wherein a correspondence between application and the transmitted files is indicated in the second inquiry result; the operational state adjustment unit opens corresponding files in corresponding applications in accordance with the absolute path or the relative path in the second inquiry result, or opens corresponding files transmitted from the first hardware system in corresponding applications in accordance with the second inquiry result.

The second control module is further used for, after completion of activation of the second hardware system, transmitting message of completion of activation to the first hardware system through the second communication module; the first control module switches the shared device from the first hardware system to the second hardware system after the message on completion of activation is received by the first hardware system through the first communication module.

The present invention further provides a switching method of a data processing device with multiple hardware systems comprising a first hardware system, a second hardware system and a shared device, the first and second hardware systems being hardware systems with independent hardware platform and software system respectively, wherein the method comprises producing a switching command when the shared device is occupied by the first hardware system and it is required to switch the shared device for use by the second hardware system; transmitting information on applications currently executed by the first hardware system to the second hardware system; activating corresponding applications in the second hardware system on the basis of information on applications currently executed in the first hardware system;

and after activation of the corresponding applications, switching the shared device from the first hardware system to the second hardware system in accordance with the switching command, and enabling the second hardware system to establish an electricity connection with the shared device so as to use the shared device.

The information on applications currently executed by the first hardware system comprises a first information and a second information, the first information being applications currently executed in the first hardware system, the second information being files respectively operated by applications currently executed in the first hardware system as well as operation positions in the files; wherein the step of activating corresponding applications in the second hardware system on the basis of information on applications currently executed in the first hardware system particularly comprises activating corresponding applications in the second hardware system in accordance with the first information, opening corresponding files in corresponding applications of the second hardware system in accordance with the second information, and jumping to corresponding operation positions in the opened files.

The first message is produced when the shared device is occupied by the first hardware system and it is required to switch the shared device for use by the second hardware system; the first information is produced by inquiring applications currently executed in the first hardware system in accordance with the first message; the second message is produced after corresponding application is activated by the second hardware system in accordance with the first information; and the second information is produced by in accordance with the second message, inquiring files respectively operated by applications currently executed in the first hardware system as well as operation positions in the files.

An absolute path or a relative path is employed in the second information to indicate the files operated by applications currently executed in the first hardware system; or when the second information is transmitted, the files operated by applications currently executed in the first hardware system are also transmitted to the second hardware system, and a correspondence between applications and the transmitted files is indicated in the second information; and opening corresponding files in corresponding applications of the second hardware system in accordance with the second information particularly refers to opening corresponding files in the corresponding applications of the second hardware system in accordance with the absolute path or the relative path in the second information, or opening, in accordance with the second information, corresponding files transmitted from the first hardware system in corresponding applications of the second hardware system.

The case in which it is required to switch the shared device for use by the second hardware system refers to a time when activation of the second hardware system is completed. The present invention further provides a data processing device with multiple hardware systems comprising a first hardware system, a second hardware system, a shared device and a switcher, wherein the first hardware system is connected to the shared device through the switcher, and includes a first inquiry module for inquiring information on applications currently executed in the first hardware system so as to obtain an inquiry result, a first control module configured for triggering the first inquiry module to perform inquiry when it is required to switch from the first hardware system to the second hardware system; a first communication module for transmitting the inquiry result to the second hardware system; and the second hardware system includes a second communication module for receiving the inquiry result, a second control module for, in accordance with the inquiry result, activating corresponding applications in the second hardware system so as to generate a first message, and transmitting the first message to the first hardware system through the second communication module; wherein the first control module configured to instruct the switcher to switch the shared device into connection with the second hardware system when the first message is received by the first hardware system through the first communication module.

The present invention further provides a computer program product comprising a computer available medium embodying a computer available program incorporated into the above data processing device with multiple hardware systems. The program causes to produce a switching command when the shared device is occupied by the first hardware system and it is required to switch the shared device for use by the second hardware system; to transmit information on applications currently executed by the first hardware system to the second hardware system; to activate corresponding applications in the second hardware system on the basis of information on applications currently executed by the first hardware system; and after activation of the corresponding applications; to switch the shared device from the first hardware system to the second hardware system in accordance with the switching command, and to enable the second hardware system to establish an electricity connection with the shared device so as to use the shared device.

The present invention further provides an activation method of a data processing device for two hardware systems used in a data processing device comprising at least a first hardware system, a second hardware system and a shared device, the first hardware system being a system that is poorer in performance and faster in activation speed with respect to the second hardware system, the method comprises: turning on the data processing device; bringing the data processing device into operation environment of the first hardware system upon completion of activation of the first hardware system; notifying the first hardware system after completion of activation of the second hardware system; producing a switching command and responding to the second hardware system when the first hardware system determines that it is required to switch the shared device for use by the second hardware system; transmitting, by the first hardware system, a first information to the second hardware system, the first information indicating applications currently executed in the first hardware system; activating applications in the second hardware system in accordance with the first information, and upon completion, notifying the first hardware system; turning off the applications in execution by the first hardware system, saving a second information and transmitting the second information to the second hardware system, the second information indicating files operated by respective applications performing operations on files as well as operation position in the files; opening corresponding files by the second hardware system in corresponding applications in accordance with the second information and jumping to corresponding operation position of the files, and upon completion, notifying the first hardware system; and switching the shared device to the second hardware system, and bringing the data processing device into operation environment of the second hardware system.

One of embodiment of present invention provides at least the following advantages. When a switching is performed between hardware systems, without manual recovery, the applications executed on the current hardware system are automatically recovered in a hardware system to be switched to, and all of processes for recovering applications are performed on the hardware system to be switched to, thus operations by the user on the current hardware system is not affected. In addition, when recovery of applications presently executed in the current hardware system on a hardware system to be switched is completed will the switching be performed, thus a seamless and smoothing switching is realized. User experience on the operation is excellent, and the user is not affected substantially.

A further embodiment of present invention provides at least the following advantages. When the applications presently executed on the current hardware system are recovered, files operated by the applications and the operation positions also can be recovered to be consistent with the state prior to the switching, thus it is not necessarily for the user to re-open the file to find operation position. A still further embodiment provides at least the following advantages. After the applications are activated in the hardware system to be switched to, the files operated by the applications in current hardware system and operation positions are notified to the hardware system to be switched to, thus operation can be continuously performed during a process of activation of application. A still further embodiment of present invention provides at least the following advantages. It allows the user to perform operation in a hardware system with fast activation, and when another hardware system completes activation, the applications presently executed on the system with fast activation are executed thereon; after completion of activation, a smoothing and seamless switching is performed. All the process will not affect the operations by user on the system with fast activation, thus the user feels like performing operation on one system all the time, and speed for turning on the system is faster than that of the existing system.

DETAILED DESCRIPTION

Technical solution of the present invention is explained in more details with reference to appended drawings and embodiments.

For a data processing device with multiple hardware systems, some hardware devices are shared by systems, and the shared device is switched to a hardware system to be used through a switcher. Switching from hardware system A to hardware system B as illustrated in the specification refers to switching the shared device originally occupied by the hardware system A into connection with the hardware system B so as to be used by the hardware system B.

Figure 1:
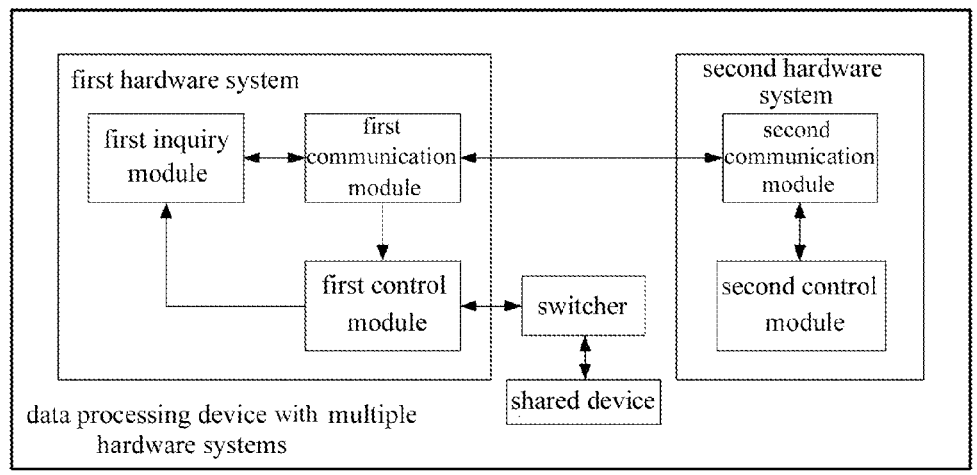
FIG. 1 is an architectural diagram illustrating a data processing device with multiple hardware systems according to a first embodiment of present invention.

As shown in FIG. 1 illustrating a first embodiment, a data processing device with multiple hardware systems comprises a first hardware system, a second hardware system, a shared device and a switcher. The first hardware system is connected to the shared device through the switcher, and includes a first inquiry module for inquiring information on applications currently executed in the first hardware system so as to obtain an inquiry result; a first control module for triggering the first inquiry module to perform inquiry when it is required to switch from the first hardware system to the second hardware system; and a first communication module for transmitting the inquiry result to the second hardware system.

The second hardware system includes a second communication module for receiving the inquiry result; a second control module for, in accordance with the inquiry result, activating corresponding applications in the second hardware system so as to generate a first message, and transmitting the first message to the first hardware system through the second communication module; wherein the first control module instructs the switcher to switch the shared device into connection with the second hardware system when the first message is received by the first hardware system through the first communication module.

In this embodiment, the first control module also can firstly determine whether there is an application performed in the first hardware system, and if not, directly instruct the switcher to switch.

In this embodiment, the switching between hardware systems can be initiated by the user himself/herself with, for example, a hot key, which indicates that it is possible to be inputted to the first control module through the shared device at the moment, or with a switching being instructed by a user interactive interface on the first hardware system, and after instruction from the user is received by the first control module, it can be determined that the shared device is to be switched to the second hardware system.

An automatic switching between hardware systems is also possible. When a trigger condition is satisfied, a switching is performed. For example, it is possible that when the first hardware system is about to be turned off, the first control module can determine that it is to be switched to a default second hardware system. In this case, the control modules in respective hardware systems need to save trigger condition for its hardware system to perform switching (user instruction also can be defined as a trigger condition). It is also possible that the second hardware system is specified in the first hardware system or the first hardware system is notified by the second hardware system actively. In this way, when it is determined that the trigger condition is satisfied, the first hardware system learns that it is to be switched to which hardware system.

It is also possible that a global control module can be set in the data processing device with multiple hardware systems. When a switching is to be performed in accordance with the trigger condition or user instruction, the first control module in the first hardware system is notified by the global control module, and after reception of notification by the first control module, it can be determined that a switching is to be performed. The switcher can be multiplexed by the global control module.

In one implementation of present embodiment, for the first hardware system, the trigger condition is ready of the second hardware system. The term of ready can refer to instances in which, for example, a hardware system is under a normal operational state such as completion of activation of hardware system, or a hardware system is recovered from an abnormal operational state such as sleeping or the like to a normal operational state. After the second hardware system is ready, the second hardware system actively transmits the information representing ready to the first hardware system. After the information is received by the first control module, it can be determined that it is required to switch to the second hardware system. If there are two hardware systems or the first hardware system knows in advance that it is to be switched to the second hardware system, it is also possible for the second hardware system to set a Ready flag, and the first hardware system can learn that the second hardware system is ready by inquiring the Ready flag.

In one implementation of present embodiment, the first inquiry module includes an application inquiry unit for inquiring applications currently executed in the first hardware system so as to obtain the first inquiry result. The second control module includes an application activation unit for activating corresponding applications in accordance with the first inquiry result, and after activation of the corresponding applications, generating the first message, and transmitting the first message to the first hardware system through the second communication module.

In another implementation of present embodiment, the inquiry result can comprise a first inquiry result and a second inquiry result. The first inquiry module includes an application inquiry unit for inquiring applications currently executed in the first hardware system so as to obtain the first inquiry result; an operational information inquiry unit for inquiring files respectively operated by applications currently executed in the first hardware system, and obtaining the second inquiry result at the operation positions in the files.

The second control module includes an application activation unit for activating corresponding applications in accordance with the first inquiry result; an operational state adjustment unit for, in accordance with the second inquiry result, opening corresponding files in corresponding applications so as to jump to corresponding operation positions, generating the first message, and transmitting the first message to the first hardware system through the second communication module.

In this embodiment, if none of the applications currently executed in the first hardware system opens a file, the second inquiry result can be excluded.

In this embodiment, if a plurality of applications in execution opened files, the second inquiry result become a plurality pieces of records each including an application, file operated by this application and operation position in this file, such as {WORD, file name or path of target text, editing position (such as which page and which paragraph)}, {Media Player, file name or path of target video file, playback position }, . . . , where in each "{ }", there is one piece of record. If files are not opened by an application, there is not any file name or operation position in the records. The second hardware system activates WORD and Media Player in accordance with the first inquiry result, then in accordance with the first piece of the records, opens the target file in WORD and jumps to a corresponding editing position, and opens the target video file in Media Player and jumps to a corresponding playback position.

In this embodiment, the first inquiry result is transmitted to the second hardware system together with the second inquiry result, and both of the application inquiry unit and the operational information inquiry unit starts to perform inquiry when triggered by the first control module. The second control module can also directly open the files respectively operated by applications currently executed in the second inquiry result, thus applications are also activated accordingly. If the second control module fails to identify a certain type of file, it is possible to interact with a "cloud" terminal (network server) and execute the application by the "cloud" terminal. It is also possible to execute a specific application for processing files that cannot be identified by a general application.

A still further implementation of present embodiment is similar to the former one, except that the application activation unit is further used for, after activation of corresponding applications, generating the second message, and transmitting the second message to the first hardware system through the second communication module; the application inquiry unit starts to perform inquiry when triggered by the first control module; and the operational information inquiry unit starts to perform inquiry after the second message is received by the first hardware system through the first communication module.

Since it takes a certain amount of time for the second control module to activate application, during this period of time, it is still possible for the user to perform operation in the first hardware system. When the second inquiry result is obtained after activation of application, it may be not necessarily for the user to halt the operation during the period of time when the second control module activates the application. A better operation effect can be brought to the user, and a seamless and smoothing switching can be realized.

In this embodiment, the first and second hardware systems can further comprise a first storage module and a second storage module respectively.

In one implementation of this embodiment, the first storage module and the second storage module are placed in different areas on a same hardware memory. The first hardware system and the second hardware system can perform reading and writing on the storage module of the counterpart. For example, a disk notation for the first and second storage modules are D and E respectively, and when disk of D is accessed by hardware systems, it is possible to get into the first storage module for reading and writing.

In this implementation, the operational information operational information inquiry unit employs an absolute path or a relative path in the second inquiry result to indicate files operated by the applications. The operational state adjustment unit can open corresponding files in corresponding applications in accordance with the absolute path or the relative path in the second inquiry result.

In this implementation, if applications currently executed in the first hardware system is a software of editing type such as OFFICE, AUTOCAD and the like, in the second inquiry result, files operated by applications can be files saved by the user, then the obtained operation position is an operation position saved by the user at a preceding previous time. Files operated by applications also can be temporary files corresponding to files in edit, then the obtained operation position is the actual operation position at the moment. For example, with WORD, the phase of "open" is typed and saved, and then the phase of "file" is sequentially typed. An inquiry is made at the time and the second inquiry result is obtained. If it is a file saved by the user that is in the second inquiry result, only the phase of "open" is present in the file, and the cursor is located immediately behind the character of "n", whereas if it is a temporal file that is in the second inquiry result, the phase of "open file" is present in the file, and the cursor is located immediately behind the character of "e".

In this embodiment, it is possible to use the absolute path or the relative path of application in the inquiry result to represent an application, the application activation unit can activate corresponding applications in accordance with the absolute path or the relative path. It is also possible to represent applications with application name or identification, the application activation unit saves the absolute path or the relative path corresponding to the respective application names or identifications, and then can activate corresponding applications in accordance with the absolute path or the relative path.

In the embodiment, when the second control module cannot activate a certain application due to difference in the operation system or the like, the second control module interacts with the "cloud" terminal (network server) and the application is executed by the "cloud" terminal.

In another implementation of present embodiment, hardware systems cannot access the storage module of the other hardware systems. At that time, the operational information inquiry unit (or an additional module in the first hardware system) can transmit the files operated by applications (saved files or temporal files) to the second hardware system through the first communication module, and indicate a correspondence between the applications and the transmitted files in the second inquiry result. For example, if a file of *.doc and a file of *.mp3 are transmitted, in the second inquiry result, the program of WORD is instructed to open the file of *.doc, and the program of Media Player is instructed to open the file of *.mp3. In accordance with the second inquiry result, the operational state adjustment unit can open corresponding files transmitted from the first hardware system in the corresponding applications. Of course, it is also possible to directly transmit files when the hardware systems can have access to the storage module of the other hardware systems.

In this implementation, an application is represented by an application name or identification in the first inquiry result, the application activate unit saves therein paths of applications corresponding to respective application names or identifications in the second hardware system, and then activates corresponding applications in accordance with the paths. For applications that are absent from the second hardware system, the application activate unit interacts with the "cloud" terminal (network server) and the applications in the application list are executed by the "cloud" terminal, while the operational state adjustment unit supplies corresponding files to application corresponding to the "cloud" terminal, for example, the file of "*.doc" is supplied to WORD program, and then receives an execution interface or result returned from the "cloud" terminal. It is possible for the application activation unit to specify an application at "cloud" terminal corresponding thereto for several kinds of application in advance, or go for "cloud" terminal temporally to search the application, alternatively or by combining both of the two ways, go for "cloud" terminal to search application only for those applications not specified in advance.

In this embodiment, the first control module can further used to record respective settings by the user as a setting file; when it is determined that a switching to the other hardware systems is required, the setting files are transmitted to the second hardware system through the first communication module; if the hardware systems can have access to the storage module of the counterpart, the absolute or relative path of the setting file also can be transmitted to the second hardware system, or a default storage path of the setting file is saved in the first and second hardware systems.

The setting file can include a setting target and a setting result. The setting target can include, for example, any one or several of contents of resolution, desktop, operation password and the like. The setting result is state of the setting target after set, which respectively can be number of resolution, path of file on desktop, new password and the like corresponding to the above ones.

Before producing the first message, the second control module performs a corresponding setting in accordance with the setting file. After switching to the second hardware system, the setting by the user after the switching is continuously recorded, and saved as a new setting file or used to update the original setting file.

In this embodiment, the data processing device can be any one of devices of desktop computer, laptop, PDA, embedded device, handheld terminal and the like.

In this embodiment, the first hardware system and the second hardware system in the data processing device, the shared device and the switcher can be integrated together, or can be modules separated from each other in physical and/or space. Those skilled in the art can realize that the first hardware system and the second hardware system can be independently operated.

In this embodiment, the shared device can include one or several of the display screen, keyboard, mouse, hard disk or the other peripherals etc.

In this embodiment, the switcher can employ, but not limit to, KVM (keyboard, display screen and mouse) switcher. In the practical application, it is also possible to use other software and hardware which can make the shared device switch between systems to achieve the switching.

In an improved implementation of present embodiment, there is provided a data processing device with multiple hardware systems comprising a first hardware system, a second hardware system, a shared device and a switcher.

The first hardware system is connected to the shared device through the switcher, and includes a first inquiry module for inquiring information on applications currently executed in the first hardware system so as to obtain an inquiry result; a first control module for triggering the first inquiry module to perform inquiry when it is required to switch from the first hardware system to the second hardware system; and a first communication module for transmitting the inquiry result to the second hardware system.

The second hardware system includes a second communication module for receiving the inquiry result; a second control module for, in accordance with the inquiry result, activating corresponding applications in the second hardware system so as to generate a first message, and transmitting the first message to the first hardware system through the second communication module.

The first control module is configured to instruct the switcher to switch the shared device into connection with the second hardware system when the first message is received by the first hardware system through the first communication module.

In the second embodiment, there is provided a switching method of a data processing device with multiple hardware systems comprising a first hardware system, a second hardware system and a shared device, the first and second hardware systems being hardware systems with independent hardware platform and software system respectively, wherein method comprises producing a switching command when the shared device is occupied by the first hardware system and it is required to switch the shared device for use by the second hardware system; transmitting information on applications currently executed by the first hardware system to the second hardware system; activating corresponding applications in the second hardware system on the basis of information on applications currently executed in the first hardware system; and after activation of the corresponding applications, switching the shared device from the first hardware system to the second hardware system in accordance with the switching command, and enabling the second hardware system to establish an electricity connection with the shared device so as to use the shared device.

In this embodiment, it is also possible to firstly determine whether there is an application performed in the first hardware system, and if not, the shared device can be directly switched from the first hardware system to the second hardware system.

In this embodiment, the switching between hardware systems can be initiated by the user himself/herself with, for example, a hotkey, which indicates that it is possible to be inputted to the first control module through the shared device at the moment, or with a switching being instructed by a user interactive interface on the first hardware system, so as to produce the switching command.

An automatic switching between hardware systems is also possible. When a trigger condition is satisfied, a switching is performed. For example, it is possible that when the first hardware system is about to be turned off, the switching command is performed. In this case, the hardware systems need to save trigger condition for itself to perform switching (user instruction also can be defined as a trigger condition). It is also possible that the second hardware system is specified in the first hardware system or the first hardware system is notified by the second hardware system actively. In this way, when it is determined that the trigger condition is satisfied, the first hardware system learns that it is to be switched to which hardware system.

In one implementation of present embodiment, for the first hardware system, the trigger condition is ready of the second hardware system. The term of ready can refer to cases in which, for example, hardware system is under a normal operational state such as completion of activation of hardware system, or hardware system is recovered from an abnormal operational state such as sleeping or the like to a normal operational state. In this implementation, the case in which the shared device is required to be switched for use by the second hardware system refers to the time when the second hardware system is ready. If there are two hardware systems or the first hardware system knows in advance that it is to be switched to the second hardware system, it is also possible for the second hardware system to set a Ready flag, and the first hardware system can learn that the second hardware system is ready by inquiring the Ready flag.

In one implementation of present embodiment, the information on applications currently executed by the first hardware system comprises: a first information and a second information; the first information being applications currently executed in the first hardware system; the second information being files respectively operated by applications currently executed in the first hardware system as well as operation positions in the files.

The step of activating corresponding applications in the second hardware system on the basis of information on applications currently executed in the first hardware system particularly comprises activating corresponding applications in the second hardware system in accordance with the first information, opening corresponding files in corresponding applications of the second hardware system in accordance with the second information, and jumping to corresponding operation positions in the opened files.

In this embodiment, if none of the applications currently executed in the first hardware system opens a file, the second inquiry result can be excluded.

In this embodiment, if a plurality of applications in execution opened files, the second inquiry result become a plurality pieces of records each including an application, file operated by this application and operation position in this file, such as {WORD, file name or path of target text, editing position (such as which page and which paragraph)}, {Media Player, file name or path of target video file, playback position }, . . . , where in each "{ }", there is one piece of record. If files are not opened by an application, there is not any file name or operation position in the records. The second hardware system activates WORD and Media Player in accordance with the first inquiry result, then in accordance with the first piece of the records, opens the target file in WORD and jumps to a corresponding editing position, and opens the target video file in Media Player and jumps to a corresponding playback position.

In this implementation, when the shared device is occupied by the first hardware system, it is required to transmit the first information and the second information which are produced when the shared device is switched for using by the second hardware system to the second hardware system together. It is also possible to directly open the files respectively operated by applications currently executed in the second information in the second hardware system, thus applications are also activated accordingly. If it fails to identify a certain type of files in the second hardware system, it is possible to interact with the "cloud" terminal (network server) and execute the application by the "cloud" terminal. It is also possible to execute a specific application for processing files that can not be identified by a general application.

A still further implementation of present embodiment is similar to the former one, except that the first message is produced when the shared device is occupied by the first hardware system and it is required to switch the shared device for use by the second hardware system; the first information is produced by inquiring applications currently executed in the first hardware system in accordance with the first message; the second message is produced after corresponding application is activated by the second hardware system in accordance with the first information; and the second information is produced by in accordance with the second message, inquiring files respectively operated by applications currently executed in the first hardware system as well as operation positions in the files.

Since it is required to take a certain time for the second hardware system to activate application, during this period of time, it is still possible for the user to perform operation in the first hardware system. When the second information is produced after activation of application, it may be not necessarily for the user to halt the operation during the period of time when the second control module is configured to activate the application.

In one implementation of this embodiment, the first and second hardware systems can perform reading and writing on memory of the counterpart. For example, the disk letter for memory of the first and second hardware systems are D and E respectively, then it is possible to get into the memory of the first hardware system for reading and writing when disk of D is accessed by hardware systems.

In this implementation, an absolute path or a relative path is employed in the second information to indicate the files operated by applications currently executed in the first hardware system; opening corresponding files in corresponding applications of the second hardware system in accordance with the second information particularly refers to: opening corresponding files in the corresponding applications of the second hardware system in accordance with the absolute path or the relative path in the second information when files are opened in the second hardware system.

In this implementation, if applications currently executed in the first hardware system is a software of editing type such as OFFICE, AUTOCAD and the like, in the second information, files operated by applications can be files saved by the user, then the obtained operation position is an operation position saved by the user at a preceding previous time. Files operated by applications also can be temporary files corresponding to files in edit, and then the obtained operation position is the actual operation position at the moment. For example, with WORD, the phase of "open" is typed and saved, and then the phase of "file" is sequentially typed. An inquiry is made at the time and the second inquiry result is obtained. If it is a file saved by the user that is in the second inquiry result, only the phase of "open" is present in the file, and the cursor is located immediately behind the character of "n", whereas if it is a temporal file that is in the second inquiry result, the phase of "open file" is present in the file, and the cursor is located immediately behind the character of "e".

In this embodiment, it is possible to use the absolute path or the relative path of application in the first information to represent an application, corresponding applications can be activated in the second hardware system in accordance with the absolute path or the relative path. It is also possible to represent applications with application name or identification, and save the absolute path or the relative path corresponding to the respective application names or identifications, and then activate corresponding applications in the second hardware system in accordance with the absolute path or the relative path.

In the embodiment, when a certain application cannot be activated in the second hardware system due to difference in the operation system or the like, the application is executed by the "cloud" terminal.

In another implementation of present embodiment, hardware systems can not access the memory of the other hardware systems. At that time, at time of transmitting the second information, it is also possible to transmit files (saved files or temporal files) operated by applications to the second hardware system, and indicate in the second information that files operated by the applications are just files that were transmitted. For example, if a *.doc file and a *.mp3 file are transmitted, in the second information, the program of WORD is instructed to open the file of *.doc, and the program of Media Player is instructed to open the file of *.mp3. Opening corresponding files in corresponding applications of the second hardware system in accordance with the second information particularly refers to opening corresponding files transmitted from the first hardware system in corresponding applications of the second hardware system in accordance with the second information. Of course, the hardware systems can directly transmit files when it is possible to access the memories of the other hardware systems.

In this implementation, an application is represented by an application name or identification in the first information, paths of applications corresponding to respective application names or identifications in the second hardware system are saved, and then corresponding applications can be activated in the second hardware system in accordance with the paths.

If it is the applications that are absent from the second hardware, the applications in application list are executed by the "cloud" terminal in the second hardware system, and corresponding files are supplied to corresponding applications at "cloud" terminal. For example, the file of *.doc is supplied to the program of WORD, and then execution interface or result returned from the "cloud" terminal is received. It is possible to specify an application at "cloud" terminal corresponding thereto for several kinds of application in advance, or go for "cloud" terminal temporally to search the application, alternatively or by combining both of the two ways, go for "cloud" terminal to search application only for those applications not specified in advance.

In this embodiment, it is also possible to record respective settings performed by the user in the first hardware system as setting file. When it is required to switch the shared device for use by the second hardware system, the setting files are transmitted to the second hardware system. If the hardware system can have access to the memory of counterpart, it is also possible to transmit the absolute or relative path of the setting file to the second hardware system, or save a default storage path of the setting file in the first and second hardware systems.

The setting file can include a setting target and a setting result. The setting target can include, for example, any one or several of contents of resolution, desktop, operation password and the like. The setting result is state of the setting target after set, which respectively can be number of resolution, path of file on desktop, new password and the like corresponding to the above ones.

Before the shared device is switched from the first hardware system to the second hardware system in accordance with the switching command, a corresponding setting can be made in the second hardware system in accordance with the setting file. After switching to the second hardware system, the setting by the user after the switching is continuously recorded, and saved as a new setting file or used to update the original setting file.

In this embodiment, the data processing device can be any one of devices of desktop computer, laptop, PDA, embedded device, handheld terminal and the like.

In this embodiment, the shared device can include one or several of the display screen, keyboard, mouse, hard disk or the other peripherals etc.

In this embodiment, the switcher can employ, but not limit to, KVM switcher. In the practical application, it is also possible to use other software and hardware which can make the shared device switch between systems to achieve the switching.

Those skilled in the art recognize that the present invention can be realized by means of software and necessary general hardware platform. Based on such comprehension, the essential of technical solution of present invention, or in other words, the part contributing to the related art, can be embodied in the form of software products. The computer software products can be stored in the storage medium such as ROM/RAM, diskette, optical disk and the like, and include several instructions to cause the computer device (which can be personal computer, server or the network device or the like) to perform the method described in respective embodiments or some part of the embodiments of the present invention.

For example, the computer products of the present invention can include a computer available medium embodying a computer available program incorporated into the above data processing device with multiple hardware systems, so as to cause: to produce a switching command when the shared device is occupied by the first hardware system and it is required to switch the shared device for use by the second hardware system; to transmit information on applications currently executed by the first hardware system to the second hardware system; to activate corresponding applications in the second hardware system on the basis of information on applications currently executed by the first hardware system; and after activation of the corresponding applications, to switch the shared device from the first hardware system to the second hardware system in accordance with the switching command, and to enable the second hardware system to establish an electricity connection with the shared device so as to use the shared device.

Figure 2:
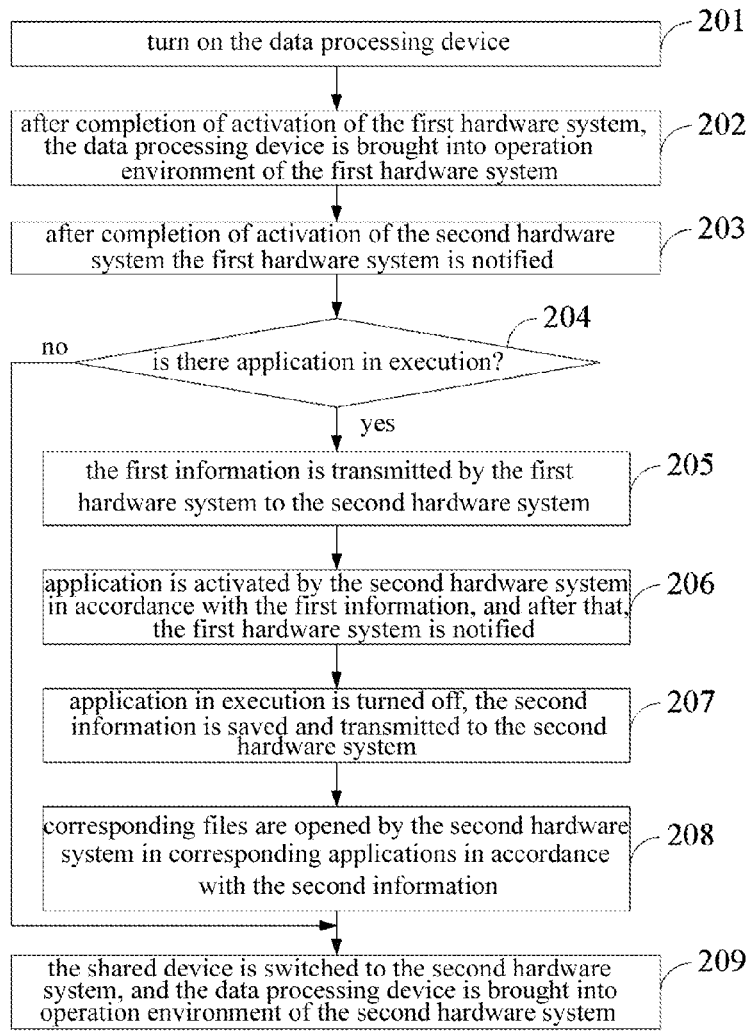
FIG. 2 is a flow diagram illustrating an activation method according to a third embodiment of present invention.

In the third embodiment, there is provided an activation method of a data processing device for two hardware systems used in a data processing device comprising at least a first hardware system, a second hardware system and a shared device, which as shown in FIG. 2, comprises the following steps.

In step 201, the data processing device is turned on, and the first and the second hardware systems starts to be activated;

the first hardware system is a system that is poorer in performance and faster in activation speed with respect to the second hardware system.

In step 202, upon completion of activation of the first hardware system, the shared device is switched for use by the first hardware system and the data processing device is brought into operation environment of the first hardware system; the application can be activated by the user in the first hardware system.

In step 203, the first hardware system is notified by the second hardware system after completion of activation; the second hardware system can actively transmit a message representing "completion of activation" to the first hardware system, and it is also possible to set a flag so that the first hardware system can learn the completion of activation of the second hardware system through inquiry.

In step 204, a switching command is produced when the first hardware system determines that it is required to switch the shared device for use by the second hardware system, so as to respond to the second hardware system; the first hardware system determines whether there exists an application in execution or not.

If application in execution does not exist, the process goes to step 209.

If there exists an application in execution, the first hardware system transmits information on applications currently in execution to the second hardware system. After corresponding applications are activated in the second hardware system in accordance with the information on applications currently in execution, applications executed in the first hardware system are turned off and the process goes to step 209. The information on applications currently in execution comprises at least a first information for indicating applications currently executed in the first hardware system, and may further include a second information for indicating files operated by respective applications performing operations on files as well as operation position in the files if applications in execution are performing operation on files. In the present embodiment, particularly, if there exists the applications in execution, the process goes to steps 205-208.

In step 205, the first information is transmitted to the second hardware system, and the second hardware system is notified to activate same applications. In this embodiment, the first information can be, but not limit to, an application list in which name or identification of applications in execution are recorded. In practical application, it is also possible to indicate applications executed on the first hardware system in another way. For example, name or identification of all applications can be included in the application list, and then a mark is made on the name or identification of applications in execution and the like.

In step 206, applications are activated in the second hardware system in accordance with the first information, and upon completion, the first hardware system is notified. Likewise, the second hardware system can actively transmit the message representing "completion of activation of applications" to the first hardware system, and it is also possible to set another flag so that first hardware system can learn the completion of activation of applications through inquiry.

In step 207, the first hardware system turns off the applications in execution, and then responds to the second hardware system.

In this embodiment, the opened files exist in the applications in execution, and the second information is saved before turning off the applications and transmitted to the second hardware system when a response is made to the second hardware system.

In the present embodiment, if a plurality of applications in execution operate files, the second information includes files operated by respective applications performing operations on files as well as current operation positions. Therefore, the second information become a plurality pieces of records, that is, name or identification of applications of operation files, files operated by the applications and current operation positions. For example, of the applications for editing files, the target file name and edit position are saved, and of the applications for video playback, the target video name and playback position are saved, and the like.

In practical application, if the opened files do not exist in the applications, after this step, the process proceeds directly go to the step of 209.

In step 208, in the second hardware, corresponding files are opened in corresponding applications in accordance with the second information, and a jump goes to corresponding operation positions of files. Upon completion, the first hardware system is notified. Likewise, the second hardware system can actively transmit the message representing "completion of open of files" to the first hardware system, and it is also possible to set another flag so that completion of open of files can be learned by the first hardware system through inquiry. The process goes to step 209.

In step 209, the shared device is switched by the first hardware system to the second hardware system. The first hardware system can choose to be automatically turned off.

At that time, the data processing device is brought into operation environment of the second hardware system.

It can be seen that, after activation of the data processing device, it is possible for the user to firstly open an operation target in the first hardware system. For example, it is possible to open the applications in need, such as applications for opening email, listening to music, watching movie, editing text and the like. It is also possible to open the files intended to be operated in the applications. Until the second hardware system is fully completed in activation and the second hardware system and the first hardware system automatically finished a series of operations at background, the second hardware system recovers operation site for whole of the first hardware system. At this moment, a switching is directed to the operation environment of the second hardware system, all of the operation targets expected by the user also have been completed in opening, and it is not necessarily to wait for completion of activation of the second hardware system before opening applications and files, thus saving the overall time from turn on of the device to open of the operation target by user. From viewpoint of the user, since it is possible to start to open applications and the like upon completion of activation of the first hardware system, it is equivalent to that the activation time is reduced.

This embodiment is illustrated in a case of two hardware systems. In practical application, it also applies to a case in which there are more hardware systems than two. In this case, the shared device is firstly switched to a hardware system which is shorter in activation time and poorer in performance, and then a switching is performed after another hardware system which is stronger in performance and longer in activation time is activated.

Figure 3:
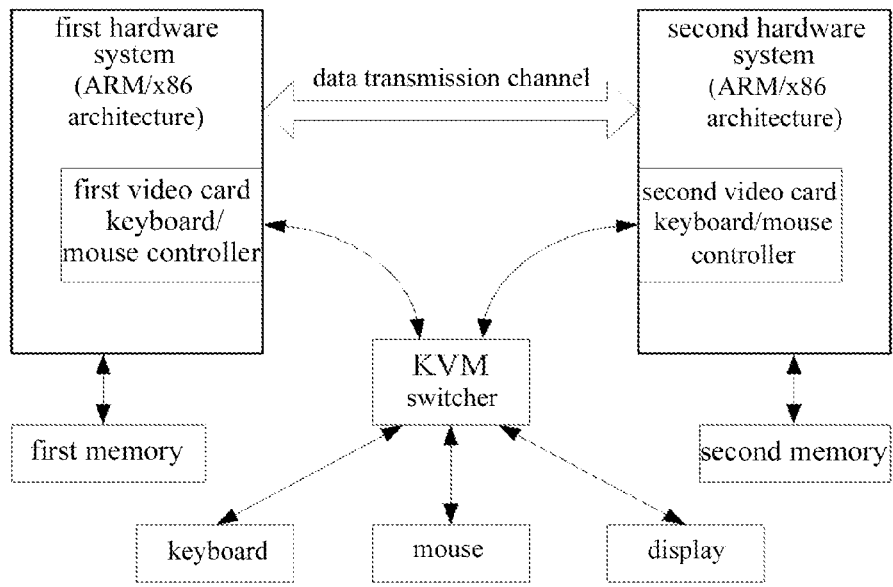
FIG. 3 is an architectural diagram illustrating a system according to a fourth embodiment of present invention.

In the fourth embodiment, there is provided a computer for two hardware systems. The block diagram of the computer is shown in FIG. 3. The computer includes a first hardware system, a second hardware system, a first memory and a second memory corresponding to the first hardware system and the second hardware system respectively, a KVM switcher and a shared device.

In this embodiment, the shared device includes a keyboard, a mouse and a display. In the first hardware system, there is included a first control module and a first inquiry module which is a first CPU in this embodiment, and there is also included a first communication module which is a first endpoint of the data transmission channel in this embodiment. In the second hardware system, there is included a second control module which is a second CPU in this embodiment, and there is also included a second communication module which is a second endpoint of the data transmission channel of the data processing device with multiple hardware systems in this embodiment, and there is further included a first user interactive module which can be video card, keyboard, mouse controller and a part for controlling video card, keyboard, mouse controller in the first CPU.

The first hardware system and second hardware system include therein a first video card and a second video card, keyboard/mouse controller respectively. The video card and keyboard/mouse controller of respective hardware systems are connected to the KVM switcher respectively. The KVM switcher is connected to the keyboard, mouse and display, and used for switching the shared device to a hardware system, that is, connecting the video card and keyboard/mouse controller of the hardware system to the display, keyboard and mouse respectively, so that the display, keyboard and mouse are occupied by the hardware system.

When the computer is turned on, the user is directed to the first hardware system firstly, and activates applications in need so as to perform operation. Until completion of activation of the second hardware system and a series of communication performed between the second hardware system and the first hardware system, a switching is automatically performed from the first hardware system to the second hardware system.

In one implementation scenario, the first hardware system and the second hardware system have a similar operation system such as Windows CE for the first hardware system and Windows XP for the second hardware system, both of which belong to operation system of Windows family. In this case, the first hardware system and the second hardware system can execute a same application, and format of files operated on the first hardware system also can be identified and executed on the second hardware system.

Figure 4:
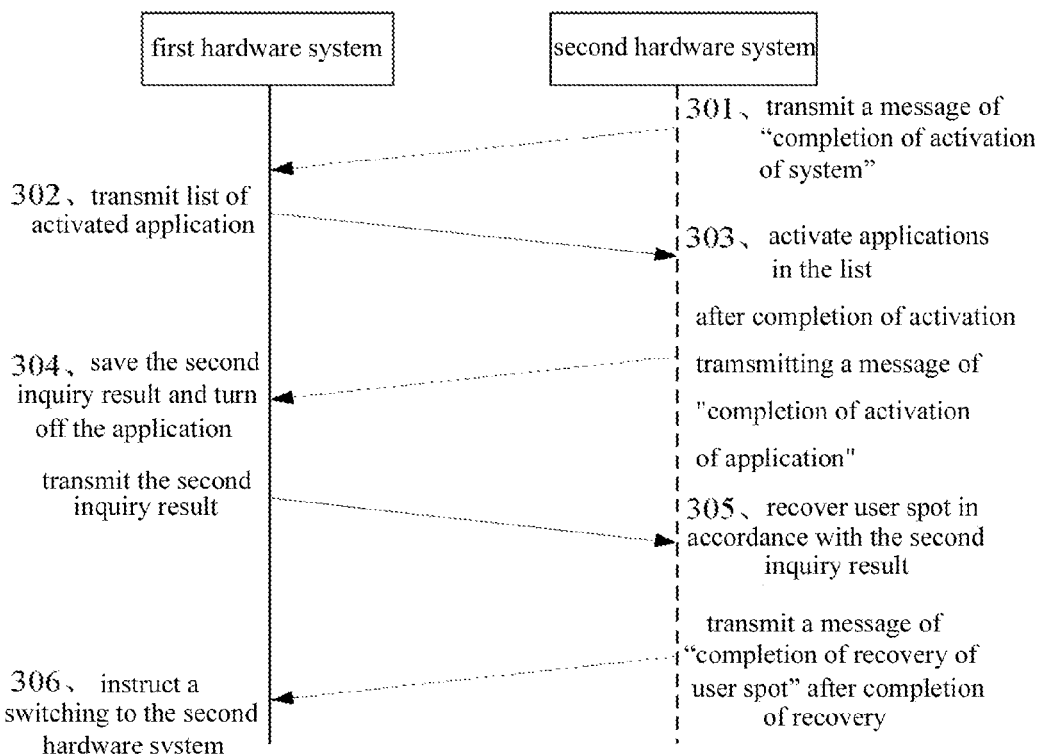
FIG. 4 is diagram of switching process according to the fourth embodiment of present embodiment.

In this implementation scenario, it is assumed that the user has activated application in the first hardware system and opened a file in the application, and as shown in FIG. 4, the switching processing includes:

at step 301 of transmitting, by the second hardware system, a message of "completion of activation of system" to the first hardware system through the second endpoint of the data transmission channel;

at step 302 of, after the message of "completion of activation of system" is received by the first CPU of the first hardware system through the first endpoint of the data transmission channel, determining that it is required to switch the shared device to the second hardware system, inquiring applications currently in execution, obtaining an application list as a first inquiry result, and transmitting it to the second hardware system through the first endpoint of the data transmission channel;

at step 303 of, after the first inquiry result is received by the second CPU of the second hardware system through the second endpoint of the data transmission channel, activating applications listed in the application list, and after completion of activation, transmitting a second message, that is, a message of "completion of activation of applications", to the first hardware system through the second endpoint of the data transmission channel;

at step 304 of, after the message of "completion of activation of applications" is received by the first CPU of the first hardware system through the first endpoint of the data transmission channel, inquiring files operated by the applications currently in execution and the current operation positions so as to obtain a second inquiry result and turn off the applications; transmitting the second inquiry result to the second hardware system through the first endpoint of the data transmission channel;

at step 305 of, after the second inquiry result is received by the second CPU of the second hardware system through the second endpoint of the data transmission channel, recovering the user site in accordance with the second inquiry result, that is, opening corresponding files in corresponding applications and jumping to corresponding operation positions, and after that, transmitting the first message of "completion of recovery of user site" to the first hardware system through the second endpoint of the data transmission channel; and at step 306 of, after the message of "completion of recovery of user site" is received by the first CPU of the firs hardware system through the first endpoint of the data transmission channel, instructing the KVM switcher to switch the shared device to the second hardware system, and bringing the computer into the operation environment of the second hardware system.

In another implementation scenario of this embodiment, different types of operation systems are executed by the second hardware system and the first hardware system, such as Linux for the operation system of the first hardware system and Window XP for the operation system of the second hardware system. In this case, it may be impossible for the second hardware system to execute and identify the applications executed on the first hardware system.

The switching process of this implementation scenario is similar to that of the above one. However, a case in which the second hardware system can not execute the applications listed in the list or open the file may occur. One implementation of this implementation scenario is to adopt a concept of "cloud computation". After the application list is received by the second hardware system, the activation programs listed in the list are activated one by one. When it is found that a certain application can not be identified or activated, an interaction is made with the "cloud" terminal (network server) and the application is executed by the "cloud" terminal, while the second hardware system provides a corresponding file to the "cloud" terminal, and receives execution interface or result returned from the "cloud" terminal. Since the number of applications or types of files belonging to the first hardware system, which can not be executed by the second hardware system is limited, it is possible for the second hardware system to specify an application at "cloud" terminal corresponding thereto for several kinds of application in advance, or go for "cloud" terminal temporally to search the application, alternatively or by combining both of the two ways, go for "cloud" terminal to search application only for those applications not specified in advance. And after the second inquiry result is received by the second hardware system, if a certain type of file among them can not be identified, for example, the suffix thereof can not be identified, or can be not opened due to version issue, it is determined to firstly open the application of this file, and then to interact with the "cloud" terminal (network server) and execute this application by the "cloud" terminal.

In another implementation, the second hardware system executes a specific application for processing type of files in the first hardware system that can not be identified by a general application.

The present invention may have many other embodiments. Those skilled the art can make various corresponding changes and variations according to the present invention without departing from the spirit and essential of the present invention, and these corresponding changes and variations shall fall into the scope claimed by claims of present invention.

What is claimed is:

1. A data processing device with multiple hardware systems, comprising:
a switcher;
a shared device;
a first hardware system coupled to the shared device through the switcher and including a first inquiry module configured to inquire information on applications currently executed in the first hardware system so as to obtain an inquiry result;
a first control module configured to trigger the first inquiry module to perform inquiry as to a timing to switch from the first hardware system to the second hardware system;
a first communication module configured to transmit the inquiry result to the second hardware system; and
a second hardware system includes a second communication module configured to receive the inquiry result;
a second control module configured to, in accordance with the inquiry result, activate corresponding applications in the second hardware system so as to generate a first message, and transmit the first message to the first hardware system through the second communication module;
wherein,
the first control module is configured to instruct the switcher to switch the shared device into connection with the second hardware system when the first message is received by the first hardware system through the first communication module~the inquiry result comprises a first inquiry result and a second inquiry result, the first inquiry module includes:
an application inquiry unit for inquiring applications currently executed in the first hardware system so as to obtain the first inquiry result, and
an operational information inquiry unit for inquiring files respectively operated by applications currently executed in the first hardware system as well as operation positions in the files, so as to obtain the second inquiry result; and the second control module includes:
an application activation unit for activating corresponding applications in accordance with the first inquiry result, and
an operational state adjustment unit for, in accordance with the second inquiry result, opening corresponding files in corresponding applications so as to jump to corresponding operation positions, generating the first message, and transmitting the first message to the first hardware system through the second communication module.

2. The device of 1, wherein the application activation unit is configured to after activation of corresponding applications, generate a second message, and transmit the second message to the first hardware system through the second communication module;
the application inquiry unit starts to perform inquiry when triggered by the first control module; and
the operational information inquiry unit starts to perform inquiry after the second message is received by the first hardware system through the first communication module.

3. The device of 1, wherein:
the operational information inquiry unit employs an absolute path or a relative path in the second inquiry result to indicate files operated by applications, or transmits files operated by the applications to the second hardware system, in which a correspondence between application and the transmitted files in the second inquiry result is indicated, through the first communication module; and
the operational state adjustment unit opens corresponding files in corresponding applications in accordance with the absolute path or the relative path in the second inquiry result, or opens corresponding files transmitted from the first hardware system in corresponding applications in accordance with the second inquiry result.

4. The device of claim 1, wherein:
the second control module is configured to, after completion of activation of the second hardware system, transmit message of completion of activation to the first hardware system through the second communication module; and
the first control module is configured to switch the shared device from the first hardware system to the second hardware system after the message on completion of activation is received by the first hardware system through the first communication module.

5. A switching method of a data processing device with multiple hardware systems comprising a first hardware system, a second hardware system and a shared device, the first and second hardware systems being hardware systems with independent hardware platform and software system respectively, the method comprising:
producing a switching command when the shared device is occupied by the first hardware system for switching the shared device for use by the second hardware system;
transmitting information on applications currently executed by the first hardware system to the second hardware system;
activating corresponding applications in the second hardware system on the basis of information on applications currently executed in the first hardware system; and after activation of the corresponding applications, switching the shared device from the first hardware system to the second hardware system in accordance with the switching command, and enabling the second hardware system to establish an electricity connection with the shared device so as to use the shared device,
wherein,
the information on applications currently executed by the first hardware system comprises a first information and a second information, the first information being applications currently executed in the first hardware system, and the second information being files respectively operated by applications currently executed in the first hardware system as well as operation positions in the files;
the step of activating corresponding applications in the second hardware system on the basis of information on applications currently executed in the first hardware system particularly comprises:
activating corresponding applications in the second hardware system in accordance with the first information,
opening corresponding files in corresponding applications of the second hardware system in accordance with the second information, and jumping to corresponding operation positions in the opened files.

6. The method of claim 5, wherein:

the first message is produced when the shared device is occupied by the first hardware system for switching the shared device for use by the second hardware system;

the first information is produced by inquiring applications currently executed in the first hardware system in accordance with the first message;

the second message is produced after corresponding application is activated by the second hardware system in accordance with the first information; and the second information is produced by in accordance with the second message, inquiring files respectively operated by applications currently executed in the first hardware system as well as operation positions in the files.

7. The method of claim 5, further comprising:

employing an absolute path or a relative path in the second information to indicate the files operated by applications currently executed in the first hardware system, or when the second information is transmitted, the files operated by applications currently executed in the first hardware system are also transmitted to the second hardware system, and a correspondence between applications and the transmitted files is indicated in the second information; and opening corresponding files in corresponding applications of the second hardware system in accordance with the second information particularly refers to:

opening corresponding files in the corresponding applications of the second hardware system in accordance with the absolute path or the relative path in the second information, or opening, in accordance with the second information, corresponding files transmitted from the first hardware system in corresponding applications of the second hardware system.

8. The method of claim 5, wherein:

a case for switching the shared device for use by the second hardware system referring to a time when activation of the second hardware system is completed.

9. A computer program product comprising a non-transitory computer readable medium embodying a computer program incorporated into of the data processing device with multiple hardware systems according to claim 1, wherein the program, when executed by a processor, performs:

to produce a switching command when the shared device is occupied by the first hardware system for switching the shared device for use by the second hardware system;

to transmit information on applications currently executed by the first hardware system to the second hardware system;

to activate corresponding applications in the second hardware system on the basis of information on applications currently executed by the first hardware system; and after activation of the corresponding applications, to switch the shared device from the first hardware system to the second hardware system in accordance with the switching command, and to enable the second hardware system to establish an electricity connection with the shared device so as to use the shared device, wherein, the information on applications currently executed by the first hardware system comprises a first information and a second information, the first information being applications currently executed in the first hardware system, and the second information being files respectively operated by applications currently executed in the first hardware system as well as operation positions in the files;

the step of activating corresponding applications in the second hardware system on the basis of information on applications currently executed in the first hardware system particularly comprises:

activating corresponding applications in the second hardware system in accordance with the first information, opening corresponding files in corresponding applications of the second hardware system in accordance with the second information, and jumping to corresponding operation positions in the opened files.

10. An activation method of a data processing device for two hardware systems used in a data processing device comprising at least a first hardware system, a second hardware system and a shared device, the first hardware system being a system that is poorer in performance and faster in activation speed with respect to the second hardware system, the method comprises:

turning on the data processing device;

bringing the data processing device into operation environment of the first hardware system upon completion of activation of the first hardware system;

notifying the first hardware system after completion of activation of the second hardware system;

producing a switching command and responding to the second hardware system when the first hardware system determines that a switching is required for the shared device for use by the second hardware system;

transmitting, by the first hardware system, a first information to the second hardware system, the first information indicating applications currently executed in the first hardware system;

activating applications in the second hardware system in accordance with the first information, and upon completion, notifying the first hardware system;

turning off the applications in execution by the first hardware system, saving a second information and transmitting the second information to the second hardware system, the second information indicating files operated by respective applications performing operations on files as well as operation position in the files;

opening corresponding files by the second hardware system in corresponding applications in accordance with the second information and jumping to corresponding operation position of the files, and upon completion, notifying the first hardware system; and switching the shared device to the second hardware system, and bringing the data processing device into operation environment of the second hardware system.

* * * * *

UNITED STATES PATENT AND TRADEMARK OFFICE
CERTIFICATE OF CORRECTION

PATENT NO. : 8,868,795 B2  Page 1 of 1
APPLICATION NO. : 13/262210
DATED : October 21, 2014
INVENTOR(S) : Haibin Ke It is certified that error appears in the above-identified patent and that said Letters Patent is hereby corrected as shown below:

On the Title Page, please correct Item (30) Foreign Priority Application Number from "CN 200910080976" to "(CN) 200910080976.3"

Signed and Sealed this
Seventeenth Day of February, 2015

Michelle K. Lee
*Deputy Director of the United States Patent and Trademark Office*